United States Patent
Takasu

(10) Patent No.: US 9,213,411 B2
(45) Date of Patent: Dec. 15, 2015

(54) INPUT USER INTERFACE DEVICE, PROJECTING DEVICE, COMMAND DECIDING METHOD AND PROGRAM STORAGE MEDIUM STORING COMMAND DECIDING METHOD PROGRAM

(71) Applicant: CASIO COMPUTER CO., LTD., Tokyo (JP)

(72) Inventor: Akihide Takasu, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 13/846,600

(22) Filed: Mar. 18, 2013

(65) Prior Publication Data

US 2013/0249790 A1    Sep. 26, 2013

(30) Foreign Application Priority Data

Mar. 21, 2012 (JP) ................................ 2012-064038

(51) Int. Cl.
*G06F 3/01* (2006.01)
*G06F 3/042* (2006.01)

(52) U.S. Cl.
CPC .............. *G06F 3/017* (2013.01); *G06F 3/0425* (2013.01); *G06F 3/0421* (2013.01)

(58) Field of Classification Search
CPC ......... G06F 3/02; G06F 3/042; G06F 3/0421; G06F 3/0423; G06F 3/0425–3/0426; G06F 3/0488; G06F 2203/04806–2203/04807
USPC ................ 345/156–158, 165–168, 173–179; 463/37–38; 178/18.01–18.09
See application file for complete search history.

(56) References Cited

U.S. PATENT DOCUMENTS

| | | | |
|---|---|---|---|
| 8,555,207 B2 | 10/2013 | Hildreth et al. | |
| 2005/0271279 A1* | 12/2005 | Fujimura et al. | 382/203 |
| 2008/0013826 A1* | 1/2008 | Hillis et al. | 382/154 |
| 2008/0141181 A1 | 6/2008 | Ishigaki et al. | |
| 2009/0103780 A1 | 4/2009 | Nishihara et al. | |
| 2009/0315740 A1* | 12/2009 | Hildreth et al. | 341/20 |
| 2011/0157025 A1* | 6/2011 | Hoover et al. | 345/173 |
| 2011/0234543 A1* | 9/2011 | Gardenfors et al. | 345/175 |

FOREIGN PATENT DOCUMENTS

| | | |
|---|---|---|
| CN | 102253573 A | 11/2011 |
| JP | 11-338120 A | 12/1999 |
| JP | 2008146243 A | 6/2008 |
| JP | 2011050013 A | 3/2011 |
| JP | 2011513847 A | 4/2011 |
| KR | 2007-0025138 A | 3/2007 |

OTHER PUBLICATIONS

Korean Office Action dated Feb. 20, 2014 (and English translation thereof) in counterpart Korean Application No. 10-2013-0029088.
Japanese Office Action (and English translation thereof) dated Jun. 23, 2015, issued in counterpart Japanese Application No. 2012-064038.
Chinese Office Action (and English translation thereof) dated Aug. 6, 2015, issued in counterpart Chinese Application No. 201310177813.3.

* cited by examiner

*Primary Examiner* — Saiful A Siddiqui
(74) *Attorney, Agent, or Firm* — Holtz, Holtz, Goodman & Chick PC

(57) ABSTRACT

An input user interface device includes an image pickup unit which picks up an image including an object image, a shape detection unit which detects a shape of the object image in the image picked up by the image pickup unit, a determination unit which determines whether the shape of the object image detected by the shape detection unit corresponds to a shape associated with a gesture command or a shape associated with a position designation command for designating a position data, and a command deciding unit which decides the gesture command or the position designation command on the basis of the decision by the deciding unit.

13 Claims, 7 Drawing Sheets

INPUT USER INTERFACE DEVICE, PROJECTING DEVICE, COMMAND DECIDING METHOD AND PROGRAM STORAGE MEDIUM STORING COMMAND DECIDING METHOD PROGRAM

BACKGROUND OF THE INVENTION

1. Field of the Invention

The present invention relates to an input user interface device, a projecting device, a command deciding method and a program storage medium storing a command deciding method program.

2. Description of Related Art

As an input user interface for using a machine such as a computer, a Perceptual User Interface to which a user can perform input through the user's gestures has been used.

Specifically, in the above interface, an image pickup unit picks up a hand gesture of a user, and a control unit as a computer then recognizes the hand gesture in the picked up image according to a predetermined algorithm to execute, for example, rotation of an image on a displayed image on the basis of the recognition result (Japanese Patent Application Laid Open Publication No. Hei 11-338120, for example).

SUMMARY OF THE INVENTION

In addition to the above, a direction-input user interface (position-input user interface) including an image pickup unit which picks up a movement of a user's hand and a control unit as a computer which moves a cursor or pointer in a displayed image area according to the picked up movement of the hand has been used.

In the case where such a direction-input user interface and the user interface described in JP Hei 11-3381 20 are combined, it is difficult to recognize whether a user's hand action represents the movement for a direction input or a hand gesture.

That is, although a user gives a gesture which seems to input a command for image rotation or the like, the control unit may misrecognize the user's action as a movement for a direction input and may move a cursor or pointer in a displayed image area.

In contrast, although a user moves a hand which seems to input a command for moving the cursor or pointer, the control unit may misrecognize the user's action as a hand gesture and, for example, may rotate the image on the displayed image.

Given the above, the present invention is made to discriminate between input of a command according to position designation by an object such as a user's hand and input of a command according to a gesture of the object other than position designation.

According to a first aspect of the present invention, there is provided an input user interface device, including:

an image pickup unit which picks up an image including an object image;

a shape detection unit which detects a shape of the object image in the image picked up by the image pickup unit;

a determination unit which determines whether the shape of the object image detected by the shape detection unit corresponds to a shape associated with a gesture command or a shape associated with a position designation command for designating a position; and a command deciding unit which decides the gesture command or the position designation command on the basis of the determination by the determination unit.

According to a second aspect of the present invention, there is provided a projecting device, including:

the input user interface device according to the above; and a projecting device body which receives a video signal from an external device and projects an image data represented by the received video signal, wherein the gesture command decided by the command deciding unit is a control command for the projecting device body.

According to a third aspect of the present invention, there is provided a method for deciding a command, including:

picking up an image including an object image;

detecting a shape of the object image in the image picked up in the picking up;

determining whether the shape detected in the detecting corresponds to a shape associated with a gesture command or a shape associated with a position designation command for designation of a position; and deciding the gesture command or the position designation command on the basis of the determination.

According to a fourth aspect of the present invention, there is provided a non-transitory computer readable recording medium storing a program to make a computer execute a procedure, the computer receiving an image input from an image pickup unit which picks up an image including an object image, the procedure including:

picking up an image including an object image;

detecting a shape of the object image in the image picked up by the image pickup unit;

determining whether the shape of the object image detected by the shape detection unit corresponds to a shape associated with a gesture command or a shape associated with a position designation command for designating a position; and deciding the gesture command or the position designation command on the basis of the determination.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, embodiments of the present invention will be described in detail with reference to the drawings.

The following embodiments involve technically preferred limitations for carrying out the present invention suitably, and thus the embodiments and the drawings are not intended as a definition of the limits of the scope of the present invention.

First Embodiment

Figure 1:
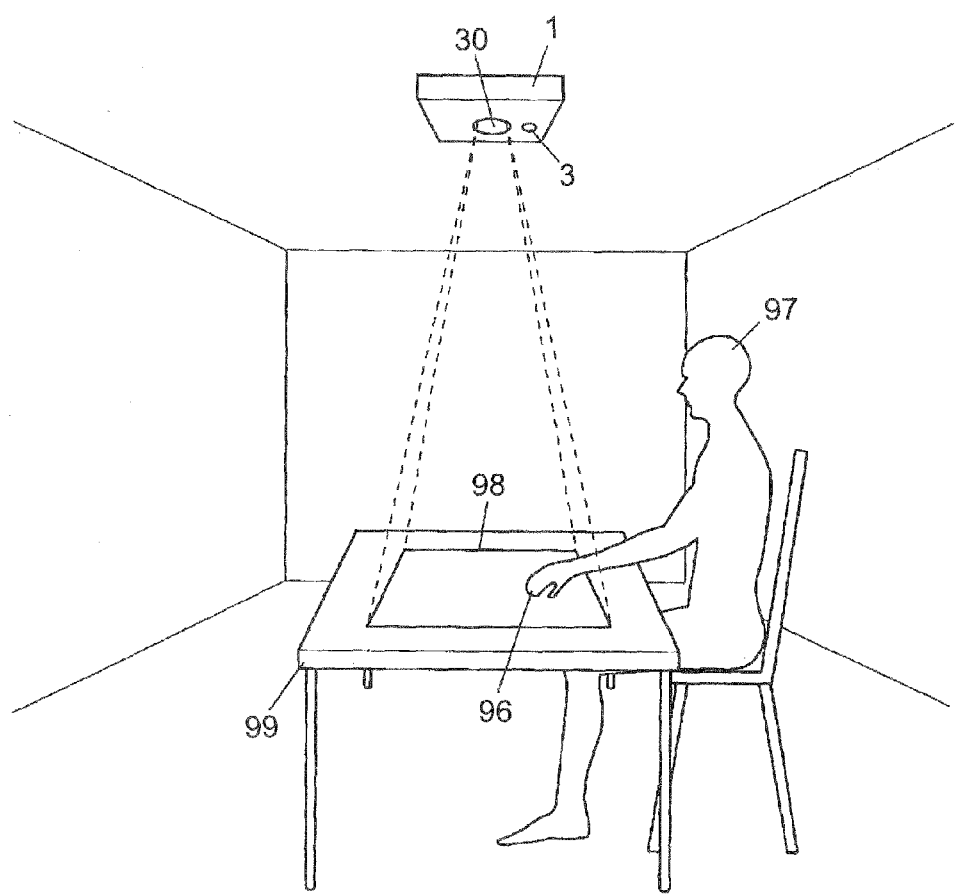
FIG. 1 is a perspective view of an input user interface device according to a first embodiment of the present invention in use.

FIG. 1 is a perspective view of an input user interface device 1 according to the first embodiment of the present invention in use.

This input user interface device 1 is a Perceptual User Interface device.

As illustrated in FIG. 1, a projected image area 98 is projected on a table 99 by a projecting device 30.

The projected image area 98 is within an image pickup region of an electronic camera 3. The image pickup region of the electronic camera 3 is almost the same in size as the projected image area 98 or larger than the projected image area 98.

A hand 96 of a user 97 is an object to be picked up by the electronic camera 3 of the input user interface device 1.

The user 97 inputs a command on the basis of a shape and a movement of the hand 96 by changing a shape of the hand 96 and moving the hand 96 over the projected image area 98 to input a gesture command.

For example, when the user 97 opens and waves the hand 96 in a state that the fingers of the hand 96 are slightly closed (see FIG. 2), switching of a page or window in the projected image area 98 is executed.

A gesture command is a command other than a position designation command described below. Examples of the gesture command other than a page switching command and a window switching command, include a click command, a selection command, a copy command, a paste command, a print screen command, a deletion command, a back space command, a page-down command, a page-up command, a new line command, a space command, a drag command, a drop command, an Alt command, a shift command, a ctrl command, a caps lock command, a tab command, a function command, a display magnification command, a display demagnification command and the like.

If multiple gesture commands are to be used, one type of hand shape and gesture is assigned to one type of gesture command.

Figure 2:
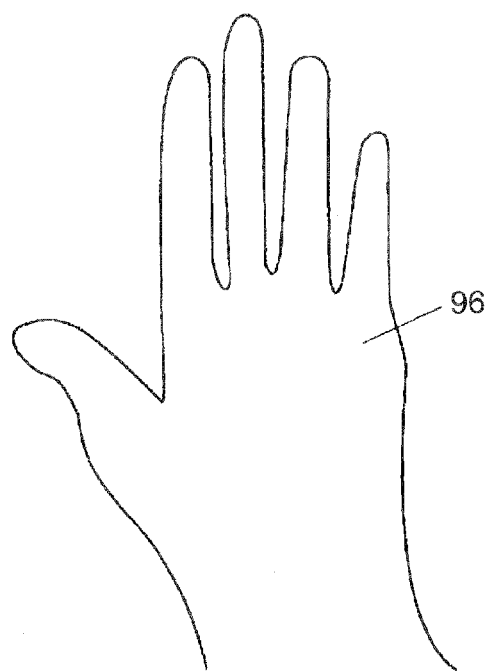
FIG. 2 illustrates a hand shape associated with a gesture command.

When the user 97 makes the hand 96 in a shape other than the shape of FIG. 2, for example, a pointing shape (see FIG. 3), the position designation command is then input.

Specifically, a cursor (pointer) is displayed at a point corresponding to a position of the hand 96 in the projected image area 98. When the user 97 moves the hand 96 in the shape of FIG. 3, the cursor in the projected image area 98 is then moved to the direction in which the hand 96 moves.

The object can be other than the hand 96 of a human, which really exists.

For example, the object can be an image such as a figure (a hand shape) or a light spot projected on the table 99 by a projecting device other than the projecting device 30 which projects the projected image area 98, a light irradiation device, a laser pointer or the like, or can be an instruction stick moved by the user 97 over the table 99.

In FIG. 1, the projecting device 30 is arranged above the table 99 to project the projected image area 98 on the table 99.

The projecting device 30 may be arranged in front of a standing wall or a screen to project the projected image area 98 on the wall or the screen.

In this case, the electronic camera 3 is also arranged in front of the wall or screen to face thereto so as to position the projected image area 98 within the image pickup region of the electronic camera 3.

Figure 4:
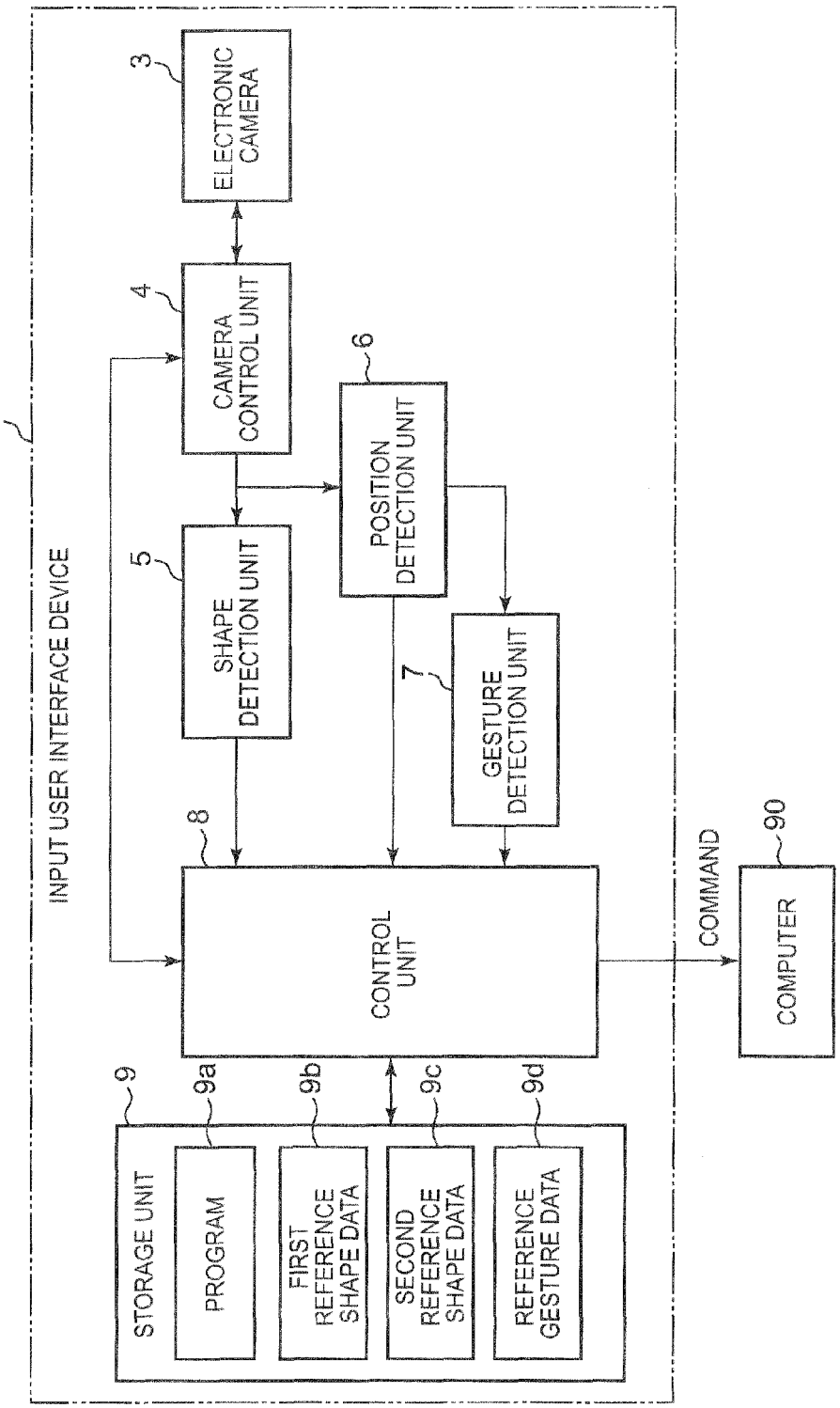
FIG. 4 is a block diagram of the input user interface device.

FIG. 4 is a block diagram of the input user interface device 1.

The input user interface device 1 includes the electronic camera 3, a camera control unit 4, a shape detection unit 5, a position detection unit 6, a gesture detection unit 7, a control unit 8 and a storage unit 9.

The electronic camera 3 as an image pickup section has an image pickup element and an image pickup lens. The image pickup lens forms an image on the image pickup element, and the image pickup element then converts the image formed by the image pickup lens to electronic signals by photoelectric conversion.

The electronic camera 3 picks up the region including the projected image area 98 and larger than the projected image area 98.

Thus, when an object (the hand 96, for example) is positioned between the projected image area 98 and the projecting device 30, an image of the object is picked up by the electronic camera 3, and a frame (image) picked up by the image pickup element of the electronic camera 3 includes the object image.

The electronic camera 3 is controlled by the camera control unit 4.

Specifically, the camera control unit 4 drives the image pickup lens of the electronic camera 3 for zooming or focusing on the image pickup lens, and the camera control unit 4 drives the image pickup element for picking up an image.

The camera control unit 4 drives the electronic camera 3 at a predetermined frame rate, thereby making the electronic camera 3 pick up an image repeatedly at the predetermined frame rate. Then, multiple frames picked up by the electronic camera 3 are sequentially transmitted to the camera control unit 4.

The camera control unit 4 sequentially performs signal processing on the multiple frames picked up by the image pickup element of the electronic camera 3 to sequentially digitize the frames. Then the digitized frames are sequentially transmitted from the camera control unit 4 to the shape detection unit 5 and the position detection unit 6.

The shape detection unit 5 as a shape detection section detects the shape of the object image in each frame transmitted from the camera control unit 4.

Specifically, the shape detection unit 5 performs image processing (for example, binarization process, feature extraction process (such as edge extraction process), or a combination thereof) on each frame transmitted from the camera control unit 4, thereby distinguishing the object image from the background image of the object and detecting the shape of the object image (the frame after the image processing).

Thereafter, the shape detection unit 5 outputs data of the detected shape of the object image in each frame (the frame after the image processing) to the control unit 8.

The shape data of the object image is constituted of pieces of position data of points on the edge of the object image in the frame, for example.

The pieces of position data of the points are represented by X and Y coordinates in an X-Y coordinate system in the frame.

The X coordinate represents the lateral position in the frame and the Y coordinate represents the vertical position in the frame.

A point of origin is the central point of the frame, one of the corners of the frame, or the like.

The multiple frames are sequentially transmitted from the camera control unit 4 to the shape detection unit 5. Then, the shape detection unit 5 sequentially detects the shape of the object image in each frame, and sequentially outputs the data of the detected shape of the object image in each frame to the control unit 8.

The position detection unit 6 as a position detection section detects a position of the object image in each frame transmitted from the camera control unit 4.

Specifically, the position detection unit 6 performs image processing (for example, binarization process, feature extraction process (such as edge extraction process), or a combination thereof) on each frame transmitted from the camera control unit 4, thereby detecting the object image from each frame and detecting the position of the object image in each frame.

Thereafter, the position detection unit 6 outputs the data of the detected position of the object image in each frame to the control unit 8.

The position data of the object image is represented by X and Y coordinates in the X-Y coordinate system in the frame.

In particular, the position data of the object image is represented by X and Y coordinates of representative point (s) of the object image (such as barycenter of the object image, one or more predetermined points on the edge of the object image, for example (when the object is the hand 96, such as point(s) on the tips of the fingers)).

The multiple frames are sequentially transmitted from the camera control unit 4 to the position detection unit 6. Then, the position detection unit 6 sequentially detects the position of the detected object image in each frame, and sequentially outputs the position data of the detected object image in each frame to the control unit 8 and the gesture detection unit 7.

The gesture detection unit 7 detects a gesture (movement) of the object image in the multiple frames transmitted from the camera control unit 4.

Specifically, the gesture detection unit 7 detects differences between the pieces of position data sequentially input from the position detection unit 6. The differences represent the gesture (movement) of the object image.

For example, the gesture detection unit 7 obtains a difference between the position data of the object image in one frame (this position data is input from the position detection unit 6) and the position data of the object image in the frame just before or multiple frames before the above frame (this position data has been input from the position detection unit 6 and temporarily latched in the gesture detection unit 7).

Thereafter, the gesture detection unit 7 outputs the data of the detected gesture of the object image to the control unit 8.

The pieces of position data of the object image detected by the position detection unit 6 are sequentially transmitted from the position detection unit 6 to the gesture detection unit 7. Then the gesture detection unit 7 sequentially detects a gesture (position change, position difference) of the object image in each frame, and sequentially outputs gesture data (data of position change, data of position difference) to the control unit 8.

The gesture data of the object image represents a position change of the object image per frame. Thus, moving speed of the object image is obtained from a position change of the object image per frame and a frame rate. Accordingly, gesture data of the object image represents moving speed of the object image.

The control unit 8 is a microcomputer having a microprocessor or the like.

The storage unit 9 is a readable and writable non-volatile semiconductor memory, a hard disk drive, or the like.

The storage unit 9 stores a program 9a which is readable and executable by the control unit 8.

The control unit 8 accesses to the storage unit 9 to execute processes according to the program 9a.

Accordingly, the control unit 8 controls the camera control unit 4 while functioning according to the program 9a.

The storage unit 9 as a shape storage section and a second shape storage section stores a first reference shape data 9b associated with a gesture command and a second reference shape data 9c associated with a position designation command.

Figure 5:
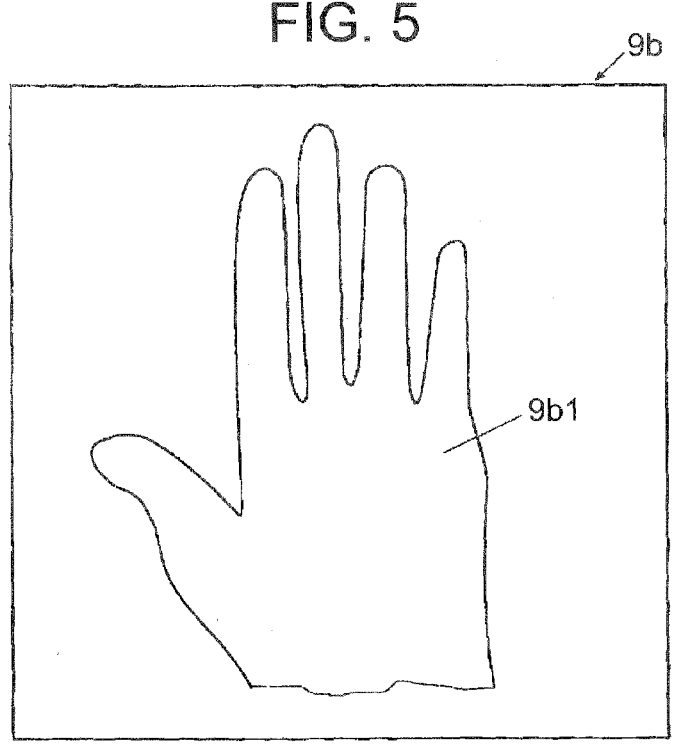
FIG. 5 is a schematic diagram of reference shape data associated with the gesture command.

The first reference shape data 9b is constituted of pieces of position data of points on the edge of a hand image whose fingers are slightly closed (hand image 9b1) as illustrated in FIG. 5, for example.

Figure 6:
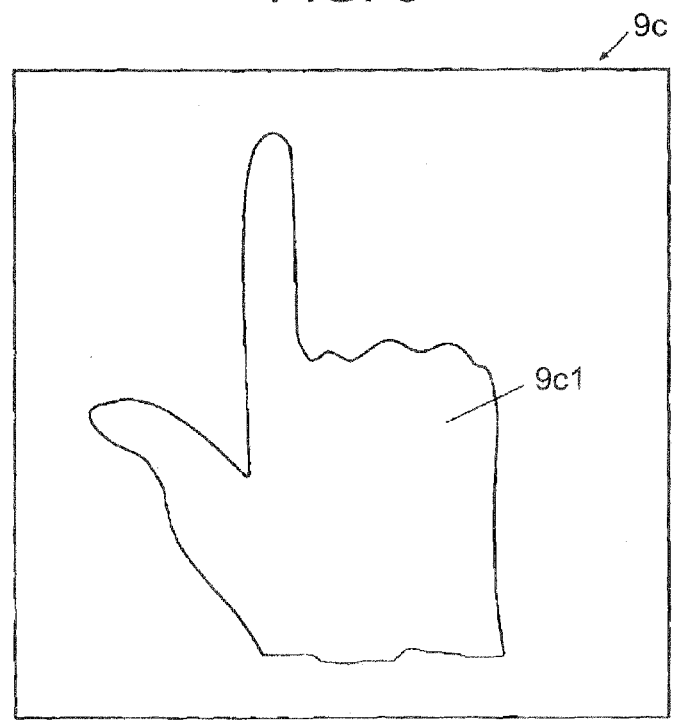
FIG. 6 is a schematic diagram of reference shape data associated with the position designation command.

The second reference shape data 9c is constituted of pieces of position data of points on the edge of a hand image in a pointing shape formed by folding the middle, ring and little fingers and stretching the forefinger (hand image 9c1) as illustrated in FIG. 6, for example.

If multiple types of gesture commands are to be used, the number of the types of first reference shape data 9b is identical to the number of the types of gesture commands. Each type of the first reference shape data 9b has specific data content. The same applies to the second reference shape data 9c.

The storage unit 9 as a gesture storage section stores reference gesture data 9d1.

The reference gesture data 9d is data of a position difference.

That is, the reference gesture data 9d is constituted of movement values in the X and Y directions.

If multiple types of gesture commands are to be used, the number of the types of reference gesture data 9d is identical to the number of the types of gesture commands. Each type of reference gesture data 9d has specific data content, and is associated with one type of first reference shape data 9b for each type of gesture commands.

The control unit 8 sequentially receives shape data of the object image, the shape data being sequentially detected for each frame by the shape detection unit 5.

The control unit 8 sequentially receives position data of the object image, the position data being sequentially detected for each frame by the position detection unit 6.

The control unit 8 sequentially receives gesture data of the object image, the gesture data being sequentially detected for each frame by the gesture detection unit 7.

The control unit 8 functions as a command deciding section in accordance with the program 9a.

That is, the control unit 8 decides a command on the basis of shape data input from the shape detection unit 5, gesture data input from the gesture detection unit 7 and the like, and then outputs the decided command to a computer 90.

The computer 90 operates according to the command input from the control unit 8.

Command deciding process executed by the control unit 8 functioning a as a command deciding section is described with reference to FIG. 7.

First, the control unit 8 determines whether the position of the object image has changed (Step S1).

The determination whether the position of the object image has changed is executed according to, for example, example 1 or 2 below.

Example 1

The control unit 8 compares the position data of the object image in one frame input from the position detection unit 6 and the position data of the object image in a frame just before or multiple frames before the above frame, thereby determining whether the position of the object image has changed (Step S1).

As a result of the comparison, if the position data is identical to each other, the control unit 8 then determines that the position of the object image has not changed (Step S1: NO). If the position data is different from each other, the control unit 8 then determines that the position of the object image has changed (Step S1: YES).

Example 2

The control unit 8 receives gesture data of the object image in one frame input from the gesture detection unit 7, and thereafter determines whether the gesture data represents no movement, thereby determining whether a position of the object image has changed (step S1)

If the input gesture data represents no movement, the control unit 6 then determines that the position of the object image has not changed (Step S1: NO). If the input gesture data does not represent no movement (any movement), the control unit 8 then determines that the position of the object image has changed (Step S1: YES).

The determination whether the position of the object image has changed can be executed according to an algorithm other than the above examples 1 and 2.

If the position of the object image has not changed (Step S1: NO), the control unit 8 then carries out Step S1 again to execute the determination of a position change of the object image in the following frame.

On the other hand, if the position of the object image has changed (Step S1: YES), the control unit 8 then compares the shape data of the object image input from the shape detection unit 5 with the first reference shape data 9b and the second reference shape data 9c (Step S2 and Step S3).

Specifically, first, the control unit 8 calculates a degree of similarity representing how the shape data of the object image and the first reference shape data 9b are similar to each other, and then compares the calculated degree of the similarity and a predetermined threshold (Step S2).

If the degree of the similarity excesses the predetermined threshold, the control unit 8 then determines that the shape data of the object image corresponds to the first reference shape data 9b (Step S2: YES). It the degree of the similarity falls below the predetermined threshold, the control unit 8 then determines that the shape data of the object image does not correspond to the first reference shape data 9b (Step S2: NO).

The same applies to a comparison between the shape data of the object image and the second reference shape data 9c (Step S4).

Note that if multiple types of gesture commands are to be used, the shape data of the object image is compared with each type of the first reference shape data 9b.

When the shape data input from the shape detection unit 5 does not correspond to the shape reference data 9b and 9c (Step S2: NO, Step S3: NO), the control unit 8 then carries out Step S1 again to execute the determination of a position change of the object image in the following frame.

When the shape data input from the shape detection unit 5 corresponds to the first shape reference data 9b (Step S2: YES), the control unit 8 then compares the gesture data input from the gesture detection unit 7 with the reference gesture data 9d (Step S4).

Note that if multiple types of gesture commands are to be used, the reference gesture data 9d associated with the first reference shape data 9b determined to correspond to the shape data of the object image at Step S2 is compared with the input gesture data from the gesture detection unit 7 for each piece of shape data of the object image corresponding to each type of gesture command.

When the gesture data of the object image input from the gesture detection unit 7 corresponds to the reference gesture data 9d (Step S4: YES), the control unit 8 then decides a gesture command associated with the gesture (Step S5). Thereafter, the control unit 8 outputs the decided gesture command to the computer 90 (Step S6).

The computer 90 operates in accordance with the gesture command input from the control unit 8.

Examples of the gesture command include a page switching command, a window switching command, a click command, a selection command, a copy command, a paste command, a print screen command, a deletion command, a back space command, a page-down command, a page-up command, a new line command, a space command, a drag command, a drop command, an Alt command, a shift command, a ctrl command, a caps lock command, a tab command, a function command, a display magnification command, a display demagnification command and the like.

When the gesture data of the object image input from the gesture detection unit 7 does nut correspond to the gesture reference data 9d (Step S4: NO), the control unit 8 then carries out Step S1 again to execute the determination of a position change of the object image in the following frame.

When the shape data of the object image input from the shape detection unit 5 does not correspond to the first reference shape data 9b (Step S2: NO) and corresponds to the second reference shape data 9c (Step S3: YES), the control unit 8 then decides a position designation command (Step S7).

Thereafter, the control unit 8 outputs the position data input from the position detection unit 6 to the computer 90 (Step S8).

Upon the input of the position data to the computer 90, the computer 90 then sets a cursor or pointer at a position corresponding to the input position data, and generates an image data including the cursor or pointer to output video signals representing the generated image data to the projecting device 30.

Accordingly, the cursor or pointer is displayed in the projected image area 98 at a position according to the position data.

As described above, the control unit 8 determines whether shape data of the picked up image of an object is associated with a gesture command (corresponding to the first shape reference data 9b) or associated with a position designation command (corresponding to the second shape reference data 9c), and then determines whether gesture data of the object image corresponds to the reference gesture data 9d. Thus, it can be correctly determined whether an action of the object (the hand 96, for example) represents an action for inputting a gesture command or for inputting a position or direction.

Therefore, a cursor or pointer is not erroneously moved when the action of the object represents input of a gesture command, and the computer 90 does not erroneously operate according to a gesture command when the action of the object represent input of a position or direction.

Specifically, an action of the hand 96 whose fingers are slightly closed as illustrated FIG. 2 by the user 97 makes the computer 90 perform an operation such as switching of pages, while not making the computer 90 move a cursor or pointer.

Therefore, a command can be correctly input.

Figure 3:
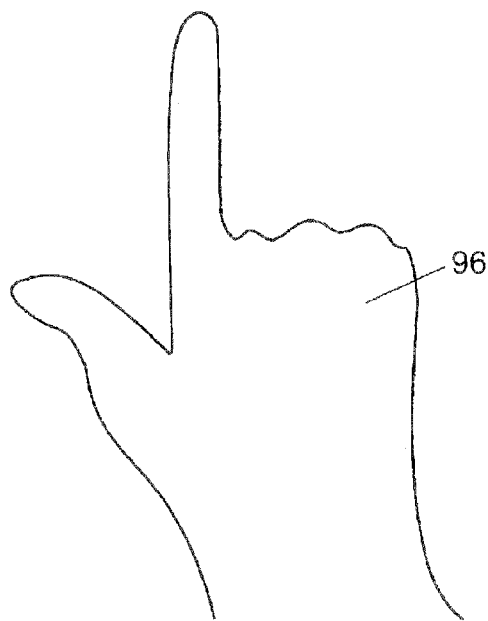
FIG. 3 illustrates a hand shape associated with a position designation command.

On the other hand, the action of the hand 96 in a pointing shape as illustrated in FIG. 3 by the user 97 makes the computer 90 move a cursor or pointer, while not making the computer 90 perform an operation such as switching of pages.

Second Embodiment

The second embodiment differs from the first embodiment only in the order of process executed by the control unit 8 in accordance with the program 9a.

Figure 8:
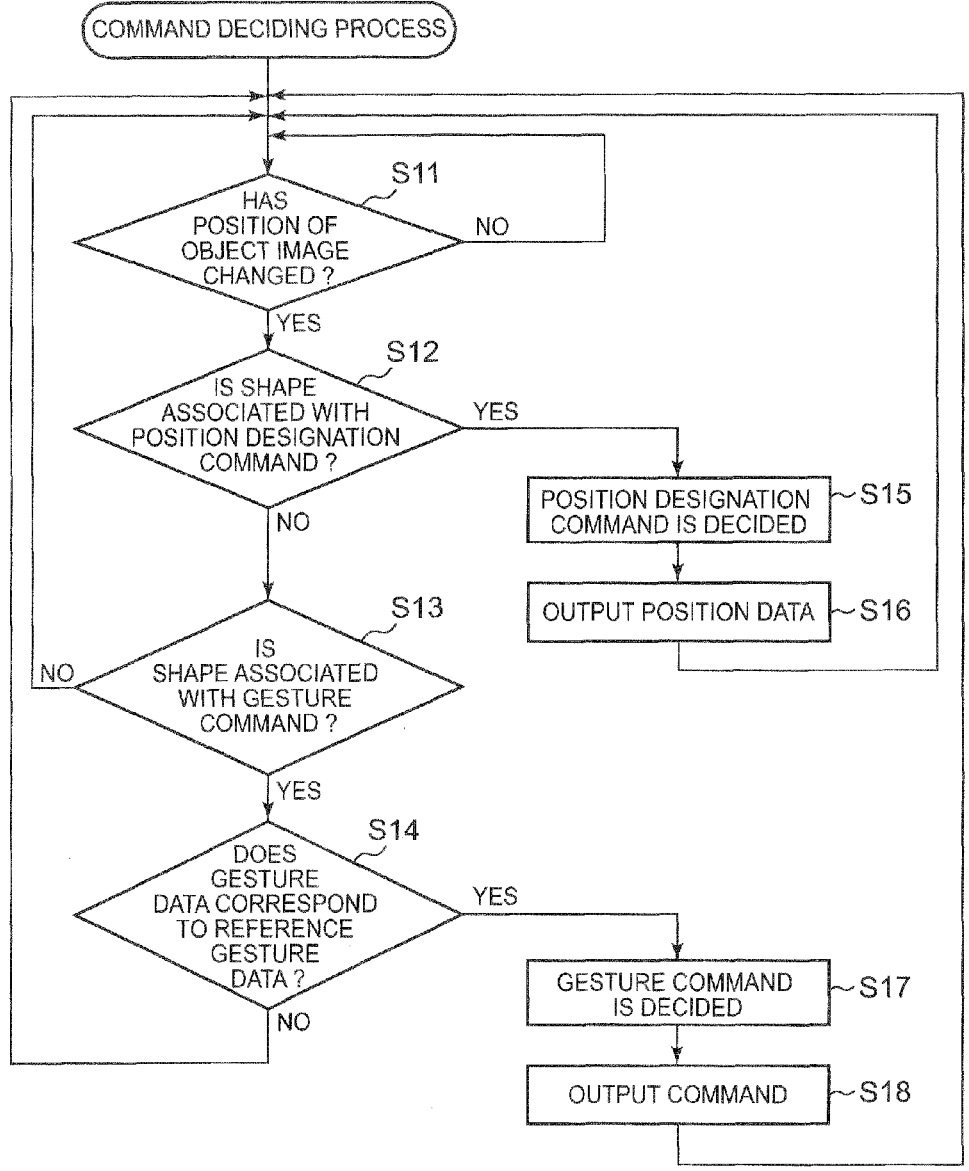
FIG. 8 is a flowchart for explaining a function and a process of a control unit of an input user interface device according to a second embodiment of the present invention.

Specifically, the command deciding process is executed by the control unit 8 in accordance with the program 9a as illustrated in FIG. 8.

Figure 7:
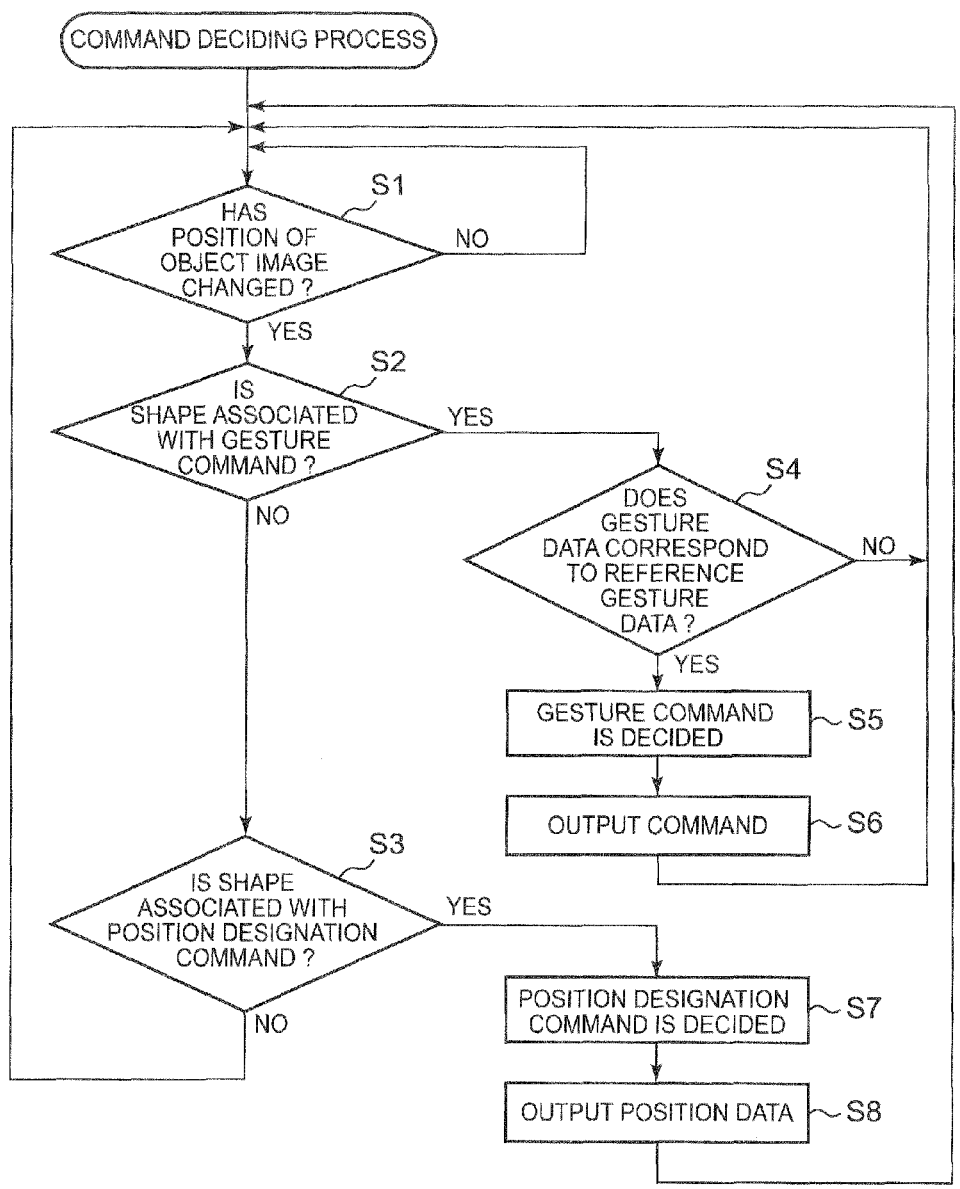
FIG. 7 is a flowchart for explaining a function and a process of a control unit of the input user interface device.

In FIG. 8, Step S11 corresponds to Step S1 in FIG. 7.

When the position of the object image has changed (Step S11: YES), the control unit 8 then carries out Step S12. When the position of the object image has not charged (Step S11: NO), the control unit 8 then carries out Step S11 again.

In FIG. 8, Step S12 corresponds to Step S3 in FIG. 7.

When the shape data of the object image input from the shape detection unit 5 corresponds to the second reference shape data 9c (Step S12: YES), the control unit 8 carries out the following steps, Steps S15 and S16.

In FIG. 8, Steps S15 and S16 correspond to Steps S7 and S8 in FIG. 7, respectively.

In FIG. 8, Steps S13 and S14 correspond to Steps S2 and S4 in FIG. 7, respectively.

When the shape data of the object image input from the shape detection unit 5 corresponds to the first reference shape data 9b (Step S13: YES), the control unit 8 then carries out Step S14. When the shape data of the object image input from the shape detection unit 5 does not correspond to the first reference shape data 9b (Step S13: NO), the control unit 8 then carries out Step S11 again.

In FIG. 8, Step S14 corresponds to Step S4 in FIG. 7.

When the gesture data of the object image input from the gesture detection unit 7 corresponds to the reference gesture data 9d (Step S14: YES), the control unit 8 then carries out Steps S17 and S18. When the gesture data of the object image input from the gesture detection unit 7 does net correspond to the reference gesture data 9d (Step S14: NO), the control unit 8 then carries out Step S11 again.

In FIG. 8, Steps S17 and S18 are identical to Steps S5 and S6 in FIG. 7, respectively.

The shape data of the object image input from the shape detection unit 5 corresponds to neither the reference shape data 9b nor 9c (Step S13: NO, Step S14: NO), the control unit 8 then carries out Step S11 again.

The second embodiment achieves the same advantages as the first embodiment.

Third Embodiment

Figure 9:
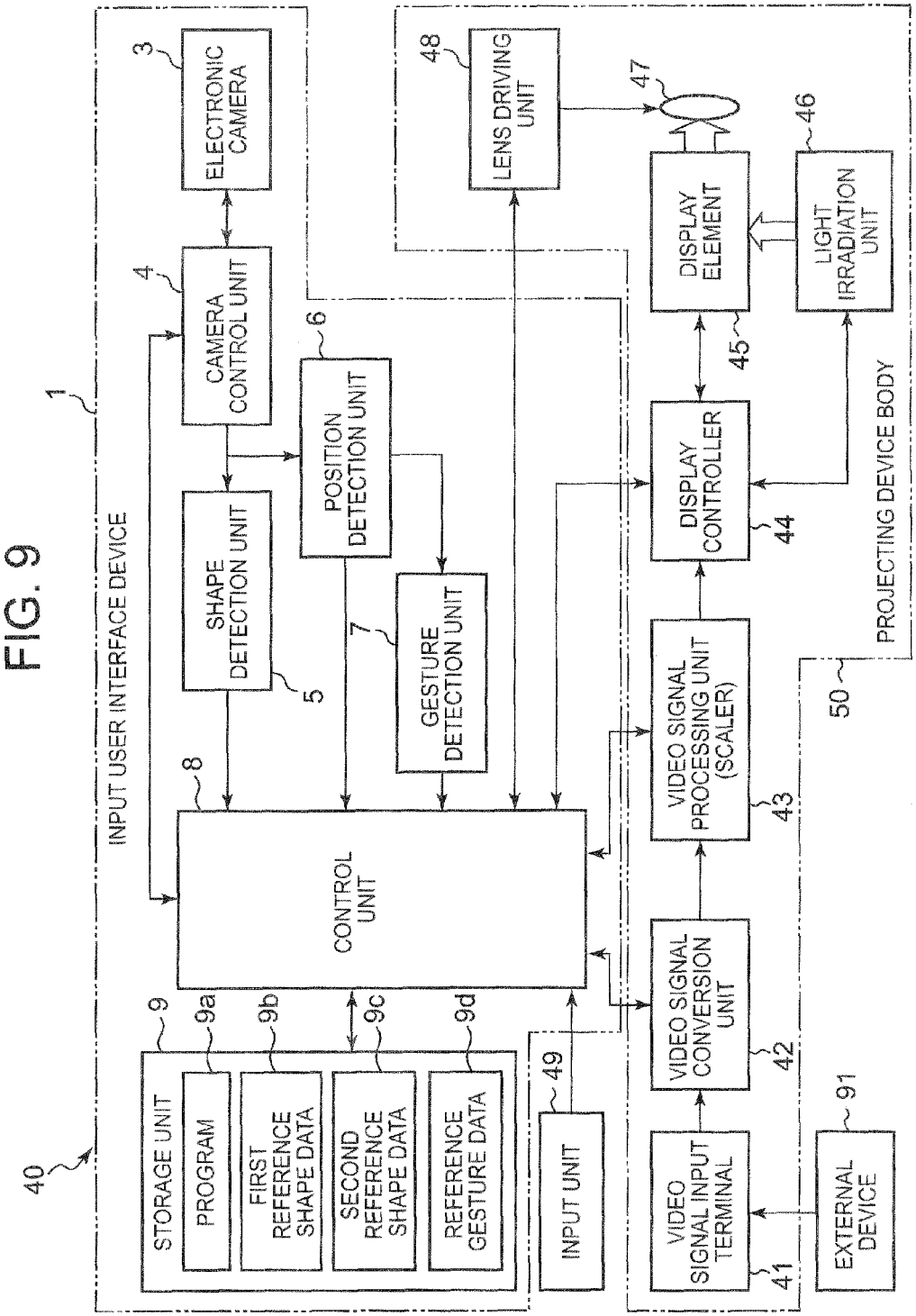
FIG. 9 is a block diagram of a projecting device according to a third embodiment of the present invention.

FIG. 9 is a block diagram of a projecting device 40 having the input user interface device 1 of the first or the second embodiment.

The projecting device 40 projects the projected image area 98, in place of the projecting device 30 illustrated in FIG. 1.

The projecting device 40 includes, in addition to the elements of the input user interface device 1 illustrated in FIG. 4, a video input terminal 41, a video signal conversion unit 42, a video signal processing unit (scalar) 43, a display controller 44, a display element 45, a light irradiation unit 46, a projecting lens 17', a lens driver 48, an input unit 49 and the like.

A projecting device body 50 is composed of the video input terminal 41, the video signal conversion unit 42, the video signal processing unit (scalar) 43, the display controller 44, the display element 45, the light irradiation unit 46, the projecting lens 47, and the lens driver 48.

The input unit 49 is composed of multiple switches (push buttons) and the like.

The input unit 49 outputs a command according to user's operation to the input unit 49, to the control unit 8.

An external device 91 has a video output terminal connected to the video input terminal 41 via a video signal cable. Video signals output by the external device 91 are input to the video input terminal 41.

Video signals may be wirelessly transmitted from the external device 91 to the projecting device 40.

The video signal conversion unit 42 converts analog video signals input via the video input terminal 41 to digital video signals, and also converts the before-mentioned digital signals or digital signals input via the video input terminal 41 to a predetermined format.

The video signal processing unit 43 performs various signal processes on video signals output by the video conversion unit 42.

For example, the video processing unit 43 performs signal on video signals output by the video conversion unit 42 to increase on decrease the number of pixels in video signals (resolution).

The video signal processing unit 43 also performs coordinate transformation of the image data (image) on the basis of the scaled video signals (projective transformation, for example) to perform distortion correction such as keystone correction.

The video signals subjected to the signal processes by the video signal processing unit 43 are then transmitted to the display controller 44.

The projected image area 98 before distortion correction is picked up by the electronic camera 3, and the outer shape of the projected image area 98 is detected by the shape detection unit 5 or the control unit 8. Thereafter, the control unit 8 calculates correction parameters on the basis of the detected outer shape, and the video signal processing unit 43 then performs coordinate transformation (projective transformation, for example) on the projected image area 98 represented by the video signals according to the correction parameters to perform distortion correction.

Accordingly, the electronic camera 3 can be used both for distortion correction and command input.

The display controller 44 drives the display element 45 according to the video signals input from the video signal processing unit 43.

The display controller 44 performs modulation control (such as PWM control or PNM control) on each pixel in the display element 45 according to the video signals input from the video signal processing unit 43. Accordingly, light irradiated to the display element 45 is modulated by pixels at each pixel.

In the above manner, the display element 45 forms an image.

The display element 45 is a digital micro mirror device (DMD) having multiple pixels arranged in a two-dimensional array and the like, a transmissive liquid crystal display (LCD) panel, or a reflective LCD panel.

When the display element 45 is a DMD, the pixels in the display element 45 are movable micro mirrors. When the display element 45 is an LCD panel, the pixels in the display element 45 are liquid crystal shutter elements.

The display controller 44 also controls the light irradiation unit 46.

The light irradiation unit 46 irradiates the display element 45 with visible light.

Specifically, the light irradiation unit 46 uses a time sharing system or a color separation system.

When the light irradiation unit 46 uses a color separation system, the light irradiation unit 46 has a white light source, a color separation unit and the like. The color separation unit separates white light emitted from the white light source to lights of multiple colors (red, green and blue, form example).

In this case, multiple display elements 45 are used for respective colors. The lights irradiate respective display elements 45, and the lights which passed through or reflected by the respective display elements 45 are combined.

When the light irradiation unit 46 uses a time sharing system, the light irradiation unit 46 repeats irradiation of the display element 45 with visible lights of different colors (red light, green light, and blue light, for example) in sequence. A cycle of the above repeat corresponds to a period of one frame.

When the light irradiation unit 46 uses a time sharing system, the light irradiation unit 46 uses a color filter system or a color light source system.

When the light irradiation unit 46 uses a color filter system, the light irradiation unit 46 has a color filter, a spindle motor, a white light source and the like. The spindle motor spins the color filter, and white light emitted from the white light source passes through the spinning color filter. Accordingly, the passed white light is repeatedly and sequentially converted into light of each color (red, green and blue).

When the light irradiation unit 46 uses a color light source system, the light irradiation unit 46 has multiple light sources of different colors (a red light source, a green light source, and a blue light source, for example), and these light sources are repeatedly and sequentially turned on.

The light source is a semiconductor luminescent element (a laser diode or luminescent diode, for example) or a lump (a halogen lamp, a xenon lamp, a metal halide lamp, a mercury lamp, or a discharge lamp, for example), or a combination of a semiconductor luminescent element or a lamp and a fluorescent substance.

The projecting lens 47 projects the image formed by the display element 45 on a screen as the projected image area 98.

In the projecting lens 47, a focus and a focal length can be adjusted.

The projecting lens 47 is driven by the lens driving unit 48.

The lens driving unit 48 performs zooming and focusing by driving the lens of the projecting lens 47.

The projecting lens 47 is arranged to face to the same direction as the electronic camera 3 (see FIG. 1).

The program 9a stored in the storage unit 9 makes the control unit 8 perform integrated control over the video signal conversion unit 42, the video signal processing unit 43, the display controller 44 and the lens driving unit 48, in addition to the camera control unit 4.

For example, the control unit 8 generates data of an image data (image) including objects such as a cursor (or a pointer), a window and the like, and outputs the image data to the video signal processing unit 43. Then the control unit 8 makes the video signal processing unit 43 perform combining process.

Transmittance of the pixel values of the background region other than the above objects in the image area is equal to or comes near 100%.

The video signal processing unit 43, which has received the above image data, combines the above objects in the image data input from the control unit 8 with the image data based on the video signals input from the video signal conversion unit 42.

Thereafter, the video signal processing unit 43 performs scaling on the video signals of the image data with which the objects have been combined, and further performs keystone correction or fitting correction of the scaled video signals.

The corrected video signals are transmitted to the display controller 44, and the display controller 44 drives the display element 45 according to the transmitted video signals.

By the above, the display element 45 forms the image data, and the light irradiating the display element 45 from the light irradiation unit 46 is projected through the projecting lens 47. Accordingly, the projected image area 98 (see FIG. 1) is projected on a screen, a wall or the table 99 (sec FIG. 1).

The control unit 8 performs processes illustrated in FIGS. 7 and 8.

Note that the control unit 8 does not output commands or position data in Steps S6, S8, S18 and S16 to the external computer 90 (FIG. 1).

Instead, the control unit 8 operates according to commands determined in Steps S5, S7, S17 and S15.

After the control unit 8 decides a gesture command as in Step S5 or S17, the control unit 8 then operates according to the decided gesture command.

Examples of the gesture command include a page switching command, a window switching command, a click command, a selection command, a copy command, a paste command, a print screen command, a deletion command, a back space command, a page-down command, a page-up command, a new line command, a space command, a drag command, a drop command, an Alt command, a shift command, a ctrl command, a caps lock command, a tab command, a function command, a display magnification command, a display demagnification command and the like.

In addition, a gesture command can be a control command for the projecting device body 50.

Examples of the control command for the projecting device body 50 include a control command for the video signal conversion unit 42, a control command for the video signal processing unit 43, a control command for the display controller 44 and a control command for the lens driving unit 48.

On the other hand, after the control unit 8 decides a position designation command as in Step S7 or S15, the control unit 8 then sets a cursor or pointer at a position according to the position data input from the position detection unit 6 on the image area (image), and output the image data including the cursor or pointer to the video signal processing unit 43. Thereafter, the control unit 8 makes the video processing unit 43 perform combining process.

Accordingly, a cursor or pointer is displayed on the projected image area 98 at a position according to the position data.

The third embodiment also achieves the same advantages as the first embodiment.

MODIFICATION

The shape detection unit 5, the position detection unit 6 and the gesture detection unit 7 can be logic circuits, or can be processes of a computer according to programs (specifically, graphics processing unit (GPU)).

In addition, the program 9a can make the control unit 8 perform the same processes as the shape detection unit 5, the position detection unit 6 and the gesture detection unit 7.

Further, the program 9a, the first reference shape data 9b, the second reference shape data 9c and the reference gesture data 9d are stored in one storage unit 9 in the above, whereas they can be separately stored in respective storage units.

Other aspects of the present invention are also not limited to the embodiments and arbitrary changes can be made.

The entire disclosure of Japanese patent Application No. 2012-064038 filed on Mar. 21, 2012 including description, claims, drawings, and abstract are incorporated herein by reference in its entirety.

Although various exemplary embodiments have been shown and described, the invention is not limited to the embodiments shown. Therefore, the scope of the present invention is on the basis of the scope of the claims that follow, and includes the equivalents thereof involving non-essential modifications.

What is claimed is:

1. An input user interface device comprising:
   an electronic camera which captures an image including an object image;
   a shape detection unit which detects a shape of the object image in the image captured by the electronic camera;
   a determination unit which determines whether a single shape of the object image detected by the shape detection unit corresponds to a shape associated with a gesture command or a shape associated with a position designation command for designating a position;
   a position detection unit which detects a position of the object image in each of a plurality of frames of the image captured by the electronic camera;
   a gesture detection unit which detects a gesture of the object image in the image based on sequentially detected positions of the object image in the plurality of frames detected by the position detection unit; and
   a controller which decides whether a single input corresponds to (i) the gesture command, based on the determination by the determination unit with respect to the single shape, data obtained via the position detection unit, and data obtained via the gesture detection unit, or (ii) the position designation command, based on the determination by the determination unit with respect to the single shape,
   wherein the controller does not use the data obtained by the gesture detection unit when deciding whether the single input corresponds to the position designation command.

2. The input user interface device according to claim 1, wherein the controller decides that the single input corresponds to the gesture command, when the determination unit determines that the single shape corresponds to a reference shape associated with the gesture command and the gesture detected by the gesture detection unit corresponds to a reference gesture associated with the gesture command.

3. The input user interface according to claim 2, further comprising a shape storage unit which stores the reference shape associated with the gesture command,
   wherein the determination unit determines whether the single shape of the object image detected by the shape detection unit corresponds to the reference shape associated with the gesture command by comparing the reference shape stored in the shape storage unit and the single shape of the object image detected by the shape detection unit.

4. The input user interface device according to claim 2, further comprising a gesture storage unit which stores the reference gesture as data of a position difference associated with the gesture command,
   wherein the unit controller determines whether the gesture detected by the gesture detection unit corresponds to the reference gesture associated with the gesture command by comparing the reference gesture stored in the gesture storage unit and the gesture detected by the gesture detection unit.

5. The input user interface device according to claim 1, wherein the controller decides that the single input corresponds to the position designation command, when the determination unit determines that the single shape corresponds to a reference shape associated with the position designation command.

6. The input user interface device according to claim 5, further comprising a shape storage unit which stores the reference shape associated with the position designation command,
   wherein the determination unit determines whether the single shape of the object image detected by the shape detection unit corresponds to the reference shape associated with the position designation command by comparing the reference shape stored in the shape storage unit and the single shape of the object image detected by the shape detection unit.

7. The input user interface according to claim 5, wherein the controller decides that the single input corresponds to the position designation command for designating the position detected by the position detection unit, when the determination unit determines that the single shape corresponds to the reference shape associated with the position designation command.

8. The input user interface device according to claim 5, wherein the reference shape is a pointing shape of a hand.

9. The input user interface device according to claim 1, wherein one of a cursor and a pointer is displayed at the position detected by the position detection unit, when the controller decides that the single input corresponds to the position designation command based on the single shape of the object image being determined by the determination unit to be associated with the position designation command.

10. A projecting device, comprising:
    an input user interface device comprising:
    an electronic camera which captures an image including an object image;
    a shape detection unit which detects a shape of the object image in the image captured by the electronic camera;
    a determination unit which determines whether a single shape of the object image detected by the shape detection unit corresponds to a shape associated with a gesture command or a shape associated with a position designation command for designating a position;
    a position detection unit which detects a position of the object image in each of a plurality of frames of the image captured by the electronic camera;
    a gesture detection unit which detects a gesture of the object image in the image based on sequentially detected positions of the object image in the plurality of frames detected by the position detection unit; and
    a controller which decides whether a single input corresponds to (i) the gesture command, based on the determination by the determination unit with respect to the single shape, data obtained via the position detection unit, and data obtained via the gesture detection unit, or (ii) the position designation command, based on the determination by the determination unit with respect to the single shape,
    wherein the controller does not use the data obtained by the gesture detection unit when deciding whether the single input corresponds to the position designation command; and a projecting device body which receives a video signal from an external device and projects image data represented by the received video signal,
wherein the input of the gesture command decided by the controller is a control command for the projecting device body.

11. The projecting device according to claim 10, further comprising a correction parameter calculation unit which detects an outer shape of an image area captured by the electronic camera and projected by the projecting device body and calculates a correction parameter based on the outer shape,
wherein the projecting device body comprises a video signal processing unit which executes distortion correction through coordinate conversion of the image area represented by the video signal based on the correction parameter calculated by the correction parameter calculation unit.

12. A method for deciding a command, the method comprising:
capturing an image including an object image using an electronic camera;
detecting a shape of the object image in the image captured in the capturing;
determining whether a single shape detected in the detecting corresponds to a shape associated with a gesture command or a shape associated with a position designation command for designating a position;
detecting a position of the object image in each of a plurality of frames of the image captured in the capturing;
detecting a gesture of the object image in the image based on sequentially detected positions of the object image in the plurality of frames; and
deciding, by a controller, whether a single input corresponds to (i) the gesture command, based on the determination with respect to the single shape, data obtained via the detecting the position of the object image, and data obtained via the detecting the gesture of the object image, or (ii) the position designation command based on the determination with respect to the single shape,
wherein the deciding whether the single input corresponds to the position designation command is not based on the data obtained via the detecting the gesture of the object image.

13. A non-transitory computer readable recording medium having a program stored thereon to control a computer to execute a procedure, the computer receiving an image input from an electronic camera which captures an image including an object image, and the procedure comprising:
capturing an image including an object image;
detecting a shape of the object image in the image captured by the electronic camera;
determining whether a single shape of the object image detected by the shape detection unit corresponds to a shape associated with a gesture command or a shape associated with a position designation command for designating a position;
detecting a position of the object image in each of a plurality of frames of the image captured by the electronic camera;
detecting a gesture of the object image in the image based on sequentially detected positions of the object image in the plurality of frames; and
deciding, by a controller, whether a single input corresponds to (i) the gesture command, based on the determination with respect to the single shape, data obtained via the detecting the position of the object image, and data obtained via the detecting the gesture of the object image, or (ii) the position designation command based on the determination with respect to the single shape,
wherein the deciding, by the controller, whether the single input corresponds to the position designation command is not based on the data obtained via the detecting the gesture of the object image.

* * * * *